June 27, 1950      J. R. WILKERSON      2,512,703
RADAR DIRECTION AND RANGE INDICATING APPARATUS
Filed Oct. 14, 1943      3 Sheets-Sheet 1
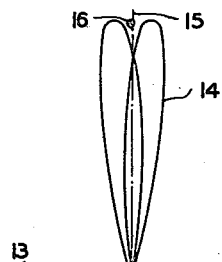
FIG. 1
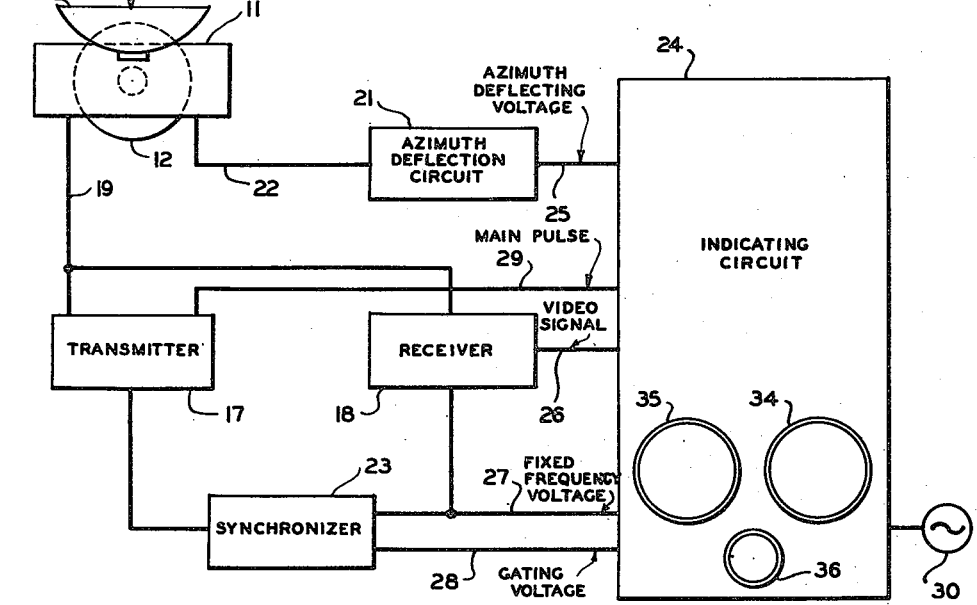
FIG. 2A      FIG. 2B      FIG. 2C
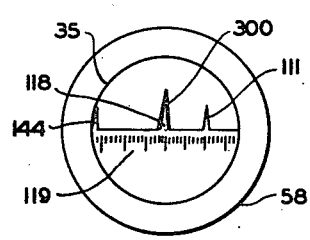 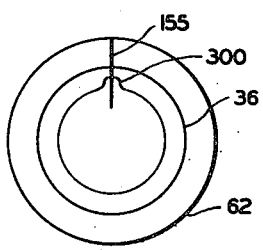 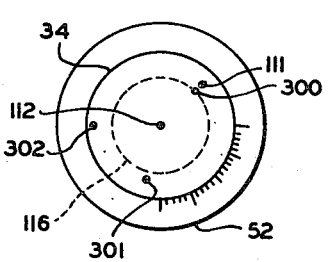
*INVENTOR.*
J. R. WILKERSON
BY
*ATTORNEY*

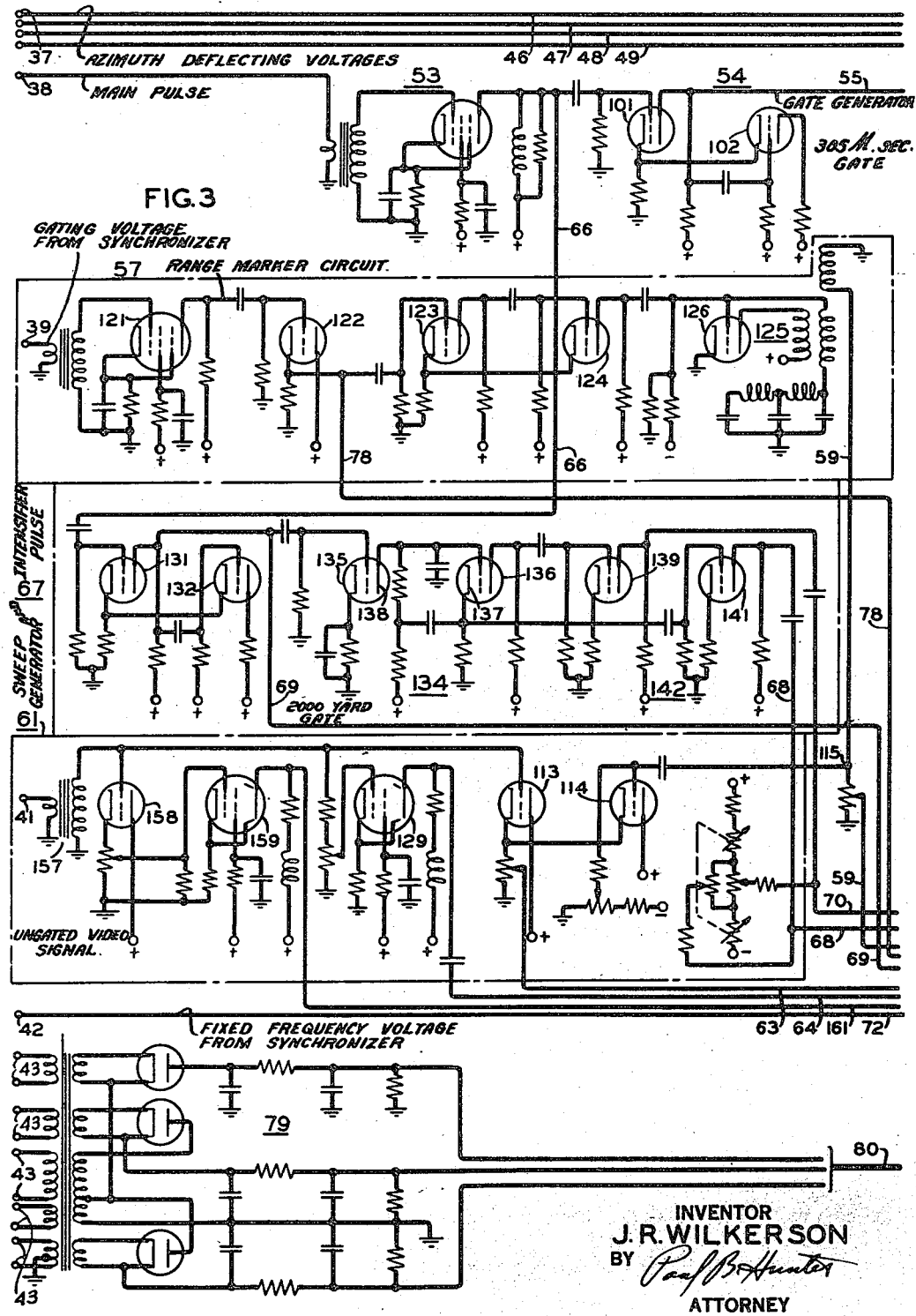

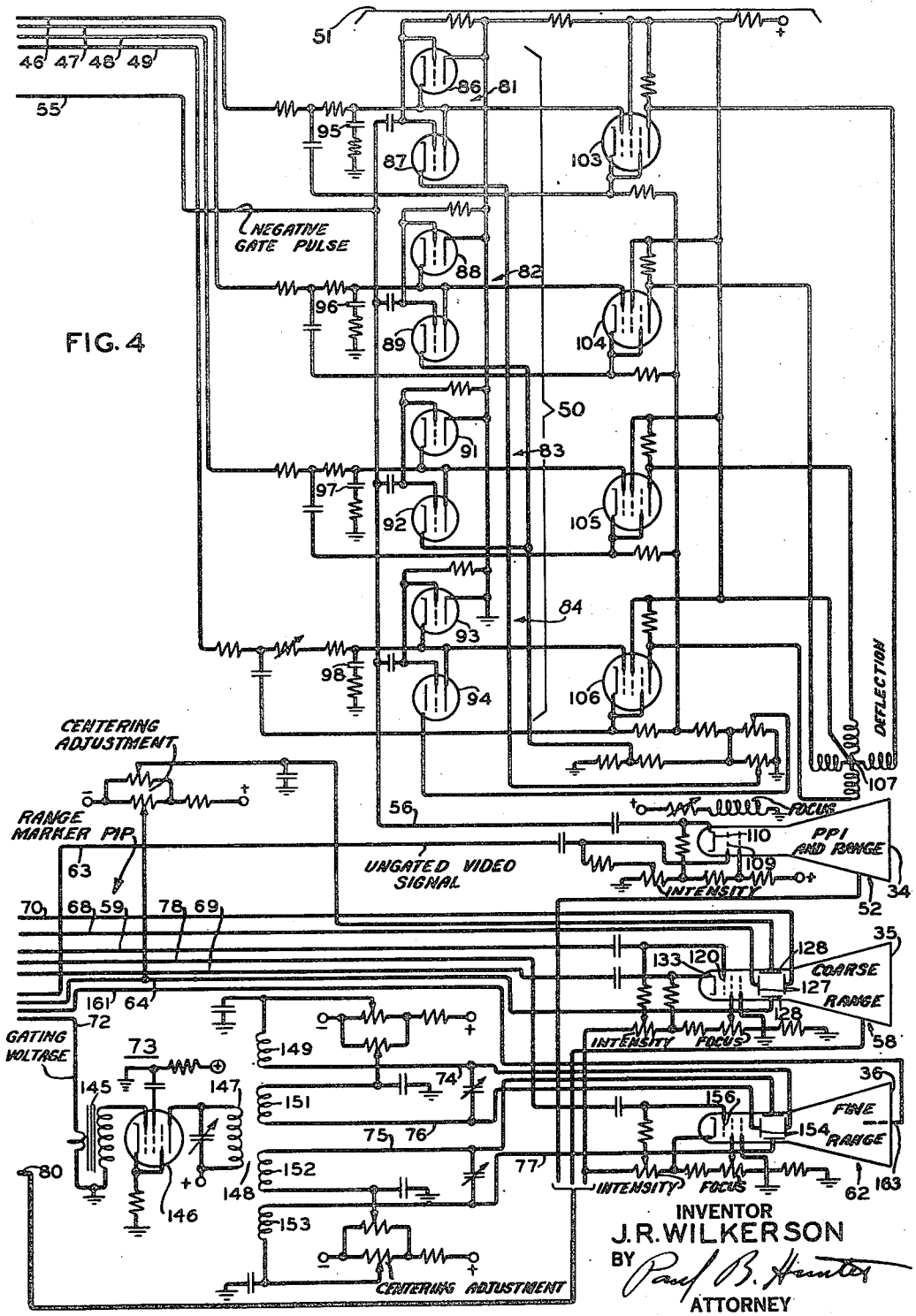

Patented June 27, 1950

2,512,703

UNITED STATES PATENT OFFICE 2,512,703

RADAR DIRECTION AND RANGE INDICATING APPARATUS

Jefferson R. Wilkerson, Bayside, N. Y., assignor to The Sperry Corporation, a corporation of Delaware Application October 14, 1943, Serial No. 506,167

6 Claims. (Cl. 343—11)

My invention relates to radar apparatus generally, and more particularly to indicator systems therefor.

As one of the functions of a radio detection and ranging system it is necessary that the apparatus be capable of "tracking" a target or object which is being detected in order that certain data concerning its approach may be obtained. To properly track the object, or to condition the system for automatic tracking, the operator must be supplied with information which is readily accessible and which is presented in concentrated form, so that physical changes in the apparatus may be accomplished rapidly. In addition to the actual tracking operation certain changes must be made in the system's electrical circuits, which must be coordinated and synchronized with physical changes in the equipment, and indications must be made available in order to accomplish this object with dispatch.

An object of the invention is the provision of an indicating system by which an operator may control a radar apparatus from a remote point. The indicating system according to the present invention displays range and azimuth information of aerial targets in the surrounding area during searching operations of an associated radar apparatus which enables the operator at the control unit to select a target for automatic tracking. The indicating system also enables an operator to track a target manually by matching pips that appear on indicator screens of cathode ray tubes provided in the indicator.

The invention provides a cathode ray tube of the plan position indicator type, on the screen of which, the targets intercepted by the radar scanning beam appear as luminous dots disposed according to the range and the angular position of the respective targets with respect to the radar apparatus. The circuits for this cathode ray tube provide for the generation of a radial sweep which turns about the screen under control of the scanner and in synchronism therewith as the scanner rotates in azimuth for searching operations.

By means of suitable controls, the operator can instantly stop the rotary search movement of the scanner and thereby the rotation of the radial sweep on the cathode ray tube and adjust the angular position of the sweep to intersect the luminous dot of a desired target and thereby direct the transmitted signals directly at the selected target for the purpose of tracking the same. Assuming the target is remote, say 40,000 to 80,000 yards away, which is beyond the range of automatic tracking, the operator by observing the radial sweep may adjust the same by suitable controls to maintain it on the luminous target dot thus keeping the radiant energy from the transmitter directed at the target until the target has approached sufficiently close for automatic tracking.

It will be understood that when the scanner is switched from search to tracking, only those targets disposed in the path of the transmitted signals appear on the plan position indicator screen. The apparatus is so arranged, that transition from tracking back to search can be made instantly to permit the operator to check momentarily, by means of the plan position indicator, the position of targets other than the one being tracked to give him an opportunity to change to another target if more favorable or approaching dangerously close.

The radial distance of the luminous target spot on the cathode ray tube screen from the center of the tube is in proportion to the range of the target. A range marker signal which is a pip synchronized with the impulses or "main bang" from the transmitter, but delayed a predetermined interval therefrom corresponding to a measure of range, wherein automatic target tracking is desired, is fed to the cathode ray tube. Due to eye and screen persistence this signal appears as a luminous circle when the radial sweep is rotating in synchronism with the antenna during search operations.

Since the effective radius of the screen of the tube referred to above is only about two inches long and represents say from 40,000 to 80,000 yards depending on the radar apparatus, it will be understood that some further means is desirable for more accurately observing and adjusting the apparatus when the target has approached the range marker. Accordingly a second cathode ray tube is provided of the "A" type, which is a conventional device that provides an indication across the diameter of the screen that corresponds to a segment of desired length of the radial indication appearing on the first-mentioned indicator tube but expanded in length. One end of the trace, the left hand one, corresponds to zero range and at a distance therefrom corresponding to the range of the range marker pip, a pedestal indication from the range marker pip circuit appears. This second cathode ray tube which is usable only during tracking, shows only the targets disposed along a given radial sweep of the first-mentioned tube. When the target is at the range marker position, the target indication is superimposed upon the range marker pedestal to provide a coarse range adjustment for bringing the target into approximate position in range with respect to a range gate used for automatic tracking. The range gate circuits are not part of the present invention and are not shown herein and do not affect the cathode ray tubes disclosed herein.

A third cathode ray tube of the "J" type is provided in the indicator which is controlled by a 2000 yard gate circuit associated with the range marker circuits and also by the received video signals. In fact, the so-called 2000 yard gate initiates the production of the range marker pip referred to above which is synchronized to occur at the midpoint of the 2000 yard gate. This gate produces a circular trace for the third tube of approximately 12 microseconds which corresponds in time to 2000 yards.

When the target or targets reach the 2000 yard area covered by the circular trace of the third tube, the video signals reflected therefrom appear as respective projections on the circular trace of the tube. These projections or pedestals do not revolve, and the one corresponding to a desired target may be moved by manual adjustment in rotation with respect to a fixed index line by changing target range or the phase of the transmitted signal.

When the target indication is positioned in alignment with the reference mark, the range of the device is accurately set, and thereafter the target may be tracked either automatically or manually. Since the video signal does not rotate, the procedure of adjusting the instrument is simplified, since it is required only to bring a relatively fixed signal into alignment with a fixed reference line. On a conventional "J" scope used in conjunction with apparatus of the kind just described, where the targets appear on the "J" scope as pedestals approximately one-sixteenth of an inch long, the range of the radar system may be adjusted within the maximum range of the associated ordnance with an accuracy within twenty yards.

A more comprehensive understanding of my invention will be afforded by the following detailed description when considered in conjunction with the accompanying drawings in which Fig. 1 is a block diagram of a radar system in which my invention may be employed;

Figs. 2a, 2b and 2c are front views of the cathode ray tubes forming a part of my improved indicating system showing the indications provided; and Figs. 3 and 4, taken conjunctively, are a schematic diagram of an embodiment of my invention.

In the radar system illustrated in Fig. 1, in which my invention may be employed, a scanning mount 11 carried on a suitable rotating track 12 is caused to rotate through a full 360°. Carried on the mount 11 is a parabolic reflector 13 having a dipole antenna (not shown) which is capable of rotation and which radiates energy into the area to be scanned. A scanning beam comprising the lobes 14 is provided and this beam, through the rotation of the antenna, forms a wave pattern about an axis of rotation 15. A target 16 located within the scanned area is detected and tracked by moving the mount 11 in azimuth and the reflector 13 in elevation until the axis of rotation of the transmitted wave pattern is brought into alignment with the detected object.

The system is provided with a transmitter 17 in which the transmitted signal is generated, and a receiver 18 which receives the transmitted pulse as a signal reflected from the surfaces of the object 16. Both the transmitted and received signals are conducted through the cable 19. The azimuth deflection voltages are received by the azimuth deflecting voltage circuit 21 through the cable 22. The azimuth deflection voltages provide data as to the angular position of the scanning device 13 and targets for the indicating apparatus of the present invention.

Transmission and reception of the signals are synchronized in a synchronizing circuit 23 which also provides reference voltages for the indicating device 24 forming an embodiment of my invention. Within the indicating circuit 24 azimuth deflection voltages received from the azimuth deflection circuit 21 through the cable 25 are received, as is the echo or video signal from the receiver 18 through cable 26. A fixed frequency voltage is supplied to the indicating circuit from the synchronizer 23 through cable 27 and a gating voltage from the same source through cable 28. The indicating circuit is supplied with main pulses from the "main bang" or transmitted pulses from the transmitter 17 over cable 29 which provides a zero time reference for the indicators.

In a manner which will be described in connection with the operation of the indicator system, the voltages received from the azimuth deflecting circuit 21, the receiver 18, the transmitter 17, and the synchronizer 23 are combined within the circuit 24 to give an indication of plan position and coarse range measurement upon the cathode ray tube screen 34, an indication of range and the position of the system's range sensing device upon the cathode ray tube screen 35, and an indication of fine range measurement upon cathode ray tube screen 36.

In the description of the indicator circuit shown in Figs. 3 and 4 and in the explanation of its operation, actual range capacities, frequency values, repetition rates, and signal lengths will be used since they are interrelated and the choice of each is based upon the speed of propagation of radio waves and the range capacities of the system. It is to be understood, however, that the values used are illustrative only, that they are not critical and that other combinations may be employed.

In the system illustrated in Figs. 3 and 4, which are to be considered conjunctively, the circuit is provided with input terminals 37 upon which are received four azimuth deflecting voltages from the azimuth deflecting device 21, shown in Fig. 1. From the transmitter 17 main pulses synchronized with the transmitted pulses are received on terminal 38, and from synchronizer 23 a gating voltage and a fixed frequency voltage are delivered respectively to terminals 39 and 42. The video signal, which comprises echo impulses reflected from targets intercepted by the transmitted pulses, is delivered to the circuit from receiver 18 through terminal 41. The power terminals 43 receive energy from source 30 (Fig. 1). From these voltages intensifier pulses, sweep voltages and deflecting voltages are generated which give a coarse measurement of range and the plan position of the target on screen 34 of cathode ray tube 52 (Fig. 4), an intermediate measurement of range and a range marker indication on screen 35 of tube 58, and a fine measurement of range on screen 36, of tube 62.

Within the sweep generating branch 51 (Fig. 4) the azimuth voltages, which are taken from the terminals 37 by conductors 46, 47, 48 and 49, are converted into sweeps for delivery to the plan position indicator tube 52.

The main pulse or "main bang" as it is known in the art from terminal 38 is derived from the transmitter and applied to a triggering device 53 (Fig. 3) which controls a gate generator 54 to produce a negative gate which is used by the tube 52 (Fig. 4) for intensification and for switching a clamping circuit 50 within the sweep generating branch 51. This gate is delivered to the clamping circuit 50 by line 55 and to tube 52 by line 56. The clamping circuit is for the purpose of maintaining the signals applied to the deflection windings 107 of tube 52 within predetermined limits.

A range marker circuit 57 (Fig. 3) supplies a "pip," or very short electrical impulse, to the grid 120 of cathode ray tube 58 (Fig. 4) through line 59. This pip, generated from the fixed pulse received at terminal 39, produces a spot on screen 35 of tube 58, as will be explained later, which indicates the position, in range, of a narrow receiver gating pulse employed in receiver 18 to "gate" the received signal. The circuits for this gating pulse are not shown herein, the range marker "pip" merely indicates the position thereof, which must be correct in order to track a target.

The ungated video signal received at terminal 41 is amplified in a video amplifier circuit 61 (Fig. 3) for delivery to the indicator tubes 52, 58 and 62. Line 63 carries this signal to the grid 109 of tube 52, line 64 to the vertical deflecting plates 128 of tube 58, and line 101 to tube 62 where it is used for radial deflection.

The pulse generated by the trigger circuit 53 is conducted through line 66 to a sweep generator branch 67 where it is used to initiate an intensifier pulse for the cathode of tube 58 and to energize a sweep wave generator which supplies the horizontal sweep for the same tube. Lines 68 and 79 carry the horizontal sweep and line 69 the intensifier pulse.

The fixed frequency voltage on terminal 42 is fed through conductor 72 to a sweep generating branch 73 which provides sweep voltages for the vertical deflecting plates of indicator tube 62 by means of the lines 74, 75, 76 and 77. Intensification for this tube is supplied from the range marker branch 57 through line 78.

High voltage power is generated in the power circuit 79 and delivered to the three indicator tubes 52, 58 and 62 through cable 80.

*Operation*

The sweep voltages for the plan position indicator 52 are generated in branch 51. Within this network, a plurality of electronic discharge devices 86, 87, 88, 89, 91, 92, 93 and 94 are connected in pairs in a conventional manner to form individual clamping circuits 81, 82, 83 and 84. These latter circuits, which make up the branch 50, receive D. C. voltages from the leads 46, 47, 48 and 49, respectively, whose magnitudes vary sinusoidally. These voltages are applied to the condensers 95, 96, 97 and 98, and when the elements of each individual clamping circuit are cut off they tend to charge toward the level of the respective azimuth deflecting voltages on leads 46, 47, 48 and 49.

All of the clamping tubes are cut off by the signal received on line 55 from the gate generator 54. The signal is generated in the elements 101 and 102, of the gate generator 54, Fig. 3, which are connected to operate as a cathode-coupled delay multivibrator. Pulse generator 54 which produces a negative gate in the order of 305 microseconds duration, is triggered by a positive pulse of approximately one microsecond duration received from the trigger generator 53.

The outputs of the clamping circuits 81, 82, 83 and 84 are delivered to the respective grid electrodes of the electron devices 103, 104, 105 and 106 which are connected to operate as amplifiers, and are thence conducted to the deflecting coils 107 of cathode-ray tube 52.

Since the rate at which condensers 95, 96, 97 and 98 receive their charge is proportional to the voltages on terminals 37, the amplitude of the sweep is likewise proportional to these voltages, and further since the voltages on leads 46, 47, 48 and 49 are proportional respectively to the positive and negative sine and positive and negative cosine of the azimuth angle, a voltage is supplied to the coils of tube 52 which produces a sweep radially from the center of screen 34 which is visible as an approximate sector of relatively intense luminosity which turns about the center of the screen of the tube 52 in synchronism with the scanner 13. The increased brilliancy results from the successive detection of targets lying in the path of the scanner 13 and spurious noise. The leading or traveling edge or radius of the sector exhibit the greatest luminosity with successive points disposed concentrically on the face of the tube 52 having progressively weaker intensities as a function of their distances from the leading edge. The leading edge of the sector indicates the angular position of the target (Fig. 2c).

A pulse of ultra high frequency energy is transmitted synchronously with the initiation of the sweep voltages on the deflection coils 107 of tube 52. This signal is reflected back from any targets within range of the device and received in the receiver 18 and constitutes the signal which is applied to the grid 109 of tube 52. Since the increase of the sweep voltage is linear, the time, as measured from the transmission of the pulse until it is received back as a reflected signal, is determined by the point on the sweep at which it is received. Hence, the signal from a given target is made to appear, by the aid of the 305 microsecond intensifier pulse on cathode 110, as an intensified spot 111 (Fig. 2c) whose distance from the center 112 of the screen is proportional to the distance to the target. Other differently located targets are shown during search, only, as luminous spots 300, 301 and 302.

Thus an indication is provided in the form of a dot for each target during search whose position on the screen's surface indicates the azimuth position of the target and its distance from the center 112 is a measurement of the target's range.

A range marker indication may also be provided for tube 52 by feeding the range pip from branch 57 to the grid 109 of tube 52 along with the video signal. Both of these signals are amplified in the video amplifying branch 61, and are taken from the cathode electrodes of electron devices 113 and 114 therein, which are connected to operate as cathode followers.

The range pip, whose generation will be explained later, is taken from line 59 at point 115 and delivered to the grid of tube 114. It appears on the screen of both indicators 52 and 58. The pip will appear on the screen 34 of cathode ray indicator 52 as a bright spot on the radial sweep, and when the radial sweep rotates, as a ring 116 as shown by dotted lines in Fig. 2c. As any target approaches the detector the spot indicating its presence will move inwardly toward the center until it reaches this ring 116, at which time the operator may change from search to tracking, and then refer to the intermediate range indicator 58 upon whose screen 35 (Fig. 2a) a finer tracking and range indication will then appear. A target 300 is shown positioned on this ring.

A linear indication extending across its horizontal diameter is provided for tube 58. At the left hand end of this trace the main pulse appears as a pip 144 to provide a zero reference. The range pip is spaced therefrom in accordance to the range setting thereof and appears as a pedestal 118. When a video signal is superimposed on pedestal 118 the brilliancy thereof is increased. Since the target video indication 300 is shown on Fig. 2c as being positioned on the range marker indication of tube 52, the pedestal 118 of tube 58 is shown in register with the target indication 300. In Fig. 2a target 111 which is in the area covered by the transmitter when tracking target 300 appears as a pip spaced to the right of pedestal 118 since the range of target 111 is greater than that of target 300.

The range pip referred to above in connection with both indicators is generated in the range marker circuit 57. Here the fixed phase gating voltage from terminal 39, whose pulse period is in the order of 12.2 microseconds, is amplified and squared in the electronic discharge device 121. From the plate of this element this gate is fed to the grid electrode of element 122 which is coupled in the circuit as a cathode follower. The 12.2 microsecond gate which corresponds to 2000 yards range is then fed to a 6 microsecond cathode-coupled delay multivibrator which comprises the elements 123 and 124 and associated connections. After a period of 6 microseconds the multivibrator trips a blocking oscillator 125, comprising in part the electronic discharge device 126, which produces the range pip. In this manner the range pip, which produces the range marker indication on both tubes 52 and 58, is made to occur in the center of the 12.2 microsecond gate. It is applied to the grid 120 of tube 58 from blocking oscillator 125 by line 59, and appears as range marker 118 on screen 35 of the tube 58.

For the purpose of automatically tracking a target, a narrow receiver gate produced in synchronizer 23 (Fig. 1) is synchronized to come at the center of the 12.2 microsecond gate. This narrow gate and the circuits therefor are not shown herein. In this manner the operator is provided an indication, in range, of the position of this narrow receiver gate, and when the range marker is moved into coincidence with a selected target signal on screen 35 of indicator 58 the receiver 18 is properly gated to receive that selected signal only.

The horizontal sweep voltage which is placed across deflecting plates 127 of tube 58 acts in conjunction with video signal received on plates 128 to produce the signal indication 111—300 on screen 35. The video signal for this tube is taken from input terminal 41 and amplified in an amplifying tube 129 in the video amplifying circuit 61. It is taken from the plate circuit of tube 129 by line 64 for direct application to vertical deflecting plates 128.

Within the sweep wave generating circuit 67, the sweep voltage on plates 127 is generated. A pulse from the trigger circuit 53 is fed through line 66 to the initial stage of a delay multivibrator comprising the elements 131 and 132, which produces a negative pulse in the order of 183 microseconds duration. This pulse is conducted by line 69 to cathode 133 of the tube 58 where it is used as an intensifier. It is also used to energize the sweep wave generator 134 which includes the electronic elements 135, 136 and their associated connections. It is to be noted that voltage is taken from cathode 137 of tube 136 for delivery to plate 138 of element 135 to provide the necessary linearity for the sweep voltage taken from this network. The sweep from generator 134 is amplified in the electronic discharge elements 139 and 141, connected as a push-pull amplifier 142, from which point it is delivered to plates 127 by the lines 68 and 70.

Cathode ray indicator 62 provides a fine range measurement indication which is projected on screen 36 thereof, as illustrated in Fig. 2b. Here the video signal appears as a radial indication such as 300. Video signal 111 is assumed to be beyond the range limits of tube 62.

The radar system with which my improved indicator system is illustrated employs in the synchronizer circuit thereof, two sinusoidally varying voltages, having identical fixed frequencies, whose phase relationship may be changed with respect to each other by shifting the phase of one of them. In the apparatus referred to, a fixed frequency of 81.94 kilocycles is chosen for these voltages, one cycle of which corresponds to a range of 2,000 yards on the basis of the speed of propagation of radio waves.

Through suitable means, which form no part of the present invention, but which are collaterally related thereto, a pulse is produced from the voltage whose phase may be shifted, such that it occurs at a fixed point in each cycle. This pulse, whose occurrence in point of time is shifted coincidentally with the phase of the sinusoidal voltage, is transmitted against the target and received as a reflected signal which appears on each of the three indicators mentioned above as the video signal referred to in connection with their operation.

Cathode ray indicator 62, which for example may be a type 3DP1, provides the operator with a means for adjusting the phase shifting elements in synchronizer 23 with such accuracy that the time required for the transmitted pulse to go out to the target and return can be measured within one cycle of the fixed frequency voltage, or, in terms of distance 2,000 yards.

To accomplish this measurement, the fixed frequency voltage of 81.94 kilocycles whose phase is constant is used to produce a circular sweep voltage for cathode ray tube 62. The former voltage, taken from synchronizer 23, is delivered from input terminal 42 through line 72 and transformer 145, to amplifier 146 in sweep generator circuit 73. From the plate circuit of amplifier 146, which has connected therein the primary winding 147 of a transformer 148, the 81.94 kilocycle voltage is induced in quadrature sequence in the secondary coils 149, 151, 152 and 153 so that the voltage on deflecting plates 154 provides a circular sweep which makes one revolution for each cycle.

This sweep is synchronized to occupy a position coincident with a reference line 155 on screen 36 when the voltage from which it is produced passes from positive to negative through its zero axis. Also timed to occur at this instant is the narrow gate for the receiver, which permits the reception of the tracking signal only. The 12.2 microsecond gate is also centered about this point and intensification is applied to grid 156 of tube 62 at this instant by using the 12.2 microsecond pulse which has been amplified and squared in tube elements 121 and 122.

A video signal voltage is applied to the radial deflection electrode 163 of tube 62 from the video amplifying circuit 61. It is taken from terminal 41, through transformer 157, which serves all of the video amplifiers within this branch, to a cathode follower 158. From this latter element it is fed to electronic discharge device 159, where it is amplified for transmission over line 161 to tube 62.

In this manner the video signals, such as 300 illustrated in Fig. 2b, and others, not shown, within the range covered by the tube 62 appear radially around the screen 36 at a distance from the center of the tube's screen which is determined by the level of the sweep voltage. These signals do not revolve continuously and are moved in rotation only by a change in target range or the phase of the transmitted signal.

When it is desired to set the indicator, a selected signal is rotated about the indicator until it occupies a position with respect to reference line 155 (Fig. 2b) such as signal 300. This is accomplished by shifting the phase of the fixed frequency voltage (81.94 kilocycles) in synchronizer 23, from which the transmitted pulse is derived. In effect, therefore, the video signal is shifted until it is received at a time coincident with the change through its zero axis of the constant phase, fixed frequency voltage (81.94 kilocycles) from which the indicator's circular sweep voltage is derived.

It is to be emphasized that the video signal received on this indicator does not rotate with the sweep. This feature simplifies the procedure of setting the instrument since it is required only to bring a relatively fixed signal into alignment with a fixed reference line.

With the indicating system above described it it possible to control a radar apparatus from a remote indicator located in a sheltered position.

When a target moves into the range of the detector, assuming in this case 50,000 yards, it will appear as a dot such as 111 on the indicator illustrated in Fig. 2c. The position of the dot shows the operator the location in plan of the target and its distance.

As the target approaches and comes within the range of the indicator illustrated in Fig. 2a, which, for example, may be 30,000 yards, a finer measurement of range may be made and a coarse adjustment of the radar system's range sensing apparatus may be made by aligning the range marker 118 with the selected signal 300 as shown.

A still finer measurement of range is made by adjusting the system's synchronizer so as to bring the selected target signal 300 into alignment with index line 155 of indicator (Fig. 2b) as described above.

Modifications of my invention are, of course, possible and may present themselves in view of the foregoing disclosure. Accordingly, the representations herein made are to be interpreted as being illustrative and nowise in a restrictive sense, and the spirit and scope of my invention is to be considered of such breadth as is defined by the appended claims.

What is claimed is:

1. In a radar indicating device, the combination of a plurality of cathode ray tubes having screens on which indications are made, a first sweep wave generating circuit for producing a radial sweep for the first of said cathode ray tubes, a second sweep wave generating circuit for producing a plurality of sweep voltages for application to the second of said cathode ray tubes, a third sweep wave generating circuit capable of producing a circular sweep for the third of said cathode ray tubes, a video amplifying circuit for amplifying a video signal for delivery to each of said first, second and third cathode ray tubes, a range marker generating circuit for producing a range marker indication on the screens of said first and second cathode ray tubes, and auxiliary circuit means for operating said sweep wave generating circuits, said video amplifying circuits and said range marker circuit producing an indication of target plan position, range and range marker indication on the first of said cathode ray tubes and an indication of range on said second and third cathode ray tubes.

2. In a radar device including a scanner rotatable in azimuth for searching for targets in an area surrounding said device, said scanner being arranged to track thereafter desired ones of the targets discovered during search, the improvement which comprises an indicator for remote control of the device which includes three cathode ray tubes, operating circuits therefor controlled by said radar device, said first tube being a plan position indicator which indicates during search, by means of a rotatable radial sweep, the targets surrounding said radar device, circuit means controlled by said radar device for causing said rotatable radial sweep to rotate in synchronism with said scanner, means for arresting the rotation of said rotatable radial sweep, said second tube being energized by said operating circuits to provide a linear sweep corresponding to said arrested radial sweep of said first tube for providing a coarse range adjustment when said scanner is tracking, said operating circuits including means controlled by the transmitted impulses of said radar device for generating electrical waves delayed with respect to said transmitted impulses, means connected to said electrical wave generator for producing pulses of such duration as to correspond to a predetermined portion of the distance between said radar device and a selected target being tracked, such portion being of a suitable range for automatic target tracking, circuit means controlled by said electrical wave generator for providing a circular sweep in said third tube, one revolution of said circular sweep corresponding to said predetermined portion between said device and said selected target, to provide a fine range indication, and means controlled by said pulse producing means for providing indications on the first and second tubes to be used in initially adjusting the device in range.

3. In a radar device including a scanner rotatable at will in azimuth for searching within a predetermined range for targets surrounding said device, said scanner being adapted to track thereafter desired ones of the targets discovered during search, the improvement which comprises an indicator for remote control of said device which includes three cathode ray tubes, energizing circuits therefor controlled by said radar device, the first of said tubes being a plan position indicator for indicating during searching by means of a rotatable radial sweep having a first repetition period, the targets surrounding said device, the second of said tubes being for coarse range adjustment and having a linear sweep having a second repetition period equal to said first repetition period of the radial sweep of said first tube for indicating coarse range data during tracking, the third of said tubes being for fine range adjustment for indicating fine range data during tracking, a source of voltage having a period corresponding to a portion of said predetermined range, said voltage source being connected to said third tube to produce a circular sweep, one revolution of said circular sweep corresponding to said predetermined range portion, a range marker generating circuit also connected to said voltage source, multivibrator means controlled by said range marker generating circuit for producing a range pip on said first and second tubes, and means for varying the phase of the transmitted pulse of said radar device with respect to said voltage to control the position of said range pip on said first and second tubes for initial range adjustment.

4. In a radar device including a scanner rotatable in azimuth for searching for targets in an area surrounding said device, said scanner being adapted also to track targets, the improvement which comprises an indicator for remote control of said device which includes three cathode ray tubes, operating circuits therefor controlled by the radar device providing video and sweep circuits for said tubes, the first of said tubes being a plan position indicator tube, said operating circuits including means for providing a rotatable radial sweep for said tube synchronized with the movements of said scanner in azimuth, said radial sweep having a first repetition period proportional to a predetermined range, said operating circuits further including means for providing a linear sweep for the second of said tubes, said linear sweep having a second repetition period corresponding to said first repetition period to aid in an initial range adjustment when tracking a selected target, said operating circuits further including means for generating an impulse, having a third repetition period and corresponding to a predetermined portions of said predetermined range, the third of said tubes having a circular sweep, said circular sweep having a period predeterminedly related to said third repetition period for indicating targets disposed within said predetermined portion of said predetermined range, to provide a fine indication for range adjustment.

5. In a radar device including a scanner rotatable in azimuth for searching for targets in an area surrounding said device, and operable also to track selected targets, the improvement which comprises an indicator for remote control of said device which includes three cathode ray tubes, operating circuits therefor controlled by said radar device providing echo and sweep circuits for said tubes, the first of said tubes being of the plan position indicator type, said circuits including means for controlling said first tube to provide on the screen thereof a radial sweep rotatable in synchronism with the movements of said scanner in azimuth, the repetition period of said radial sweep corresponding to a predetermined range, the second of said tubes being controlled by said operating circuits for providing a linear sweep having a repetition period maintained in predetermined relationship with respect to said repetition period of said radial sweep to provide a coarse range indication effective when said scanner is tracking a selected target, said circuits including further means for generating impulses having a duration related to said repetition period of said linear sweep, thereby corresponding to a predetermined portion of the distance of said radar device from said selected target being tracked wherein automatic tracking is possible, means for controlling the third of said tubes by said impulse generating means for producing a circular sweep having a period equal to said duration of said impulses produced by said impulse generating means, and means in said circuits for providing an indication of said selected target being tracked on said third tube to provide a fine range indication for adjusting said radar device preliminary to automatic tracking.

6. In a radar device, three cathode ray tubes having screens on which indications appear, a first sweep wave generating circuit for producing recurrent radial sweeps in said first tube and progressively advancing their angular direction thereof at a substantially uniform angular rate, said radial sweeps having a first repetition period, a second sweep wave generating circuit for producing a linear sweep for the second of said tubes, said linear sweep having a repetition period equal to said first repetition period, said second tube sweeps being of duration corresponding to a predetermined range, a third sweep wave generating circuit for producing a circular sweep for the third of said tubes, said circular sweep having a third repetition period maintained in predetermined time relationship with said second repetition period, said third repetition period corresponding to a selected portion of said predetermined range, a video amplifying circuit for amplifying a video signal for delivery to said first, second and third tubes, a range marker generating circuit connected to said first and second tubes for producing a range marker indication on the screens of said first and second tubes; said video amplifying circuit and said range marker circuit producing a target plan position and range marker indications on the screen of said first tube, range marker and target indications on the screens of said second tubes, and target indications on the screen of said third tube.

JEFFERSON R. WILKERSON.

REFERENCES CITED

The following references are of record in the file of this patent:

UNITED STATES PATENTS

| Number | Name | Date |
| --- | --- | --- |
| 2,208,422 | Hugon | July 16, 1940 |
| 2,208,733 | Roberts | July 23, 1940 |
| 2,227,598 | Lyman et al. | Jan. 7, 1941 |
| 2,295,412 | Little | Sept. 8, 1942 |
| 2,313,966 | Poch | Mar. 16, 1943 |
| 2,395,966 | Goldberg | Mar. 5, 1946 |
| 2,403,625 | Wolff | July 9, 1946 |
| 2,405,239 | Seeley | Aug. 6, 1946 |
| 2,407,294 | Shockley et al. | Sept. 10, 1946 |
| 2,408,848 | Hammond | Oct. 8, 1946 |
| 2,416,088 | Deerhake | Feb. 18, 1947 |

FOREIGN PATENTS

| Number | Country | Date |
| --- | --- | --- |
| 520,778 | Great Britain | May 3, 1940 |
| 542,634 | Great Britain | Jan. 21, 1941 |
| 552,072 | Great Britain | Mar. 22, 1943 |